(12) United States Patent
Merrill et al.

(10) Patent No.: US 6,923,429 B2
(45) Date of Patent: Aug. 2, 2005

(54) ELECTRICAL GROUNDING ASSEMBLY FOR CONTROL VALVE

(75) Inventors: Peter K. Merrill, Greenland, NH (US); Joel R. Anderson, Berwick, ME (US)

(73) Assignee: Fisher Controls International LLC, St. Louis, MO (US)

( * ) Notice: Subject to any disclaimer, the term of this patent is extended or adjusted under 35 U.S.C. 154(b) by 92 days.

(21) Appl. No.: 10/602,386

(22) Filed: Jun. 24, 2003

(65) Prior Publication Data

US 2004/0262561 A1 Dec. 30, 2004

(51) Int. Cl.[7] .................................................. F16K 43/00
(52) U.S. Cl. ..................... 251/176; 251/305; 137/15.18
(58) Field of Search .................................... 251/176, 305, 251/306; 137/15.18, 15.25

(56) References Cited

U.S. PATENT DOCUMENTS 4,566,482 A * 1/1986 Stunkard ............... 137/315.21
4,637,421 A     1/1987 Stunkard

FOREIGN PATENT DOCUMENTS

| FR | 2398241 | 2/1979 |
|---|---|---|
| GB | 1151215 | 5/1969 |
| GB | 1425617 | 2/1976 |

OTHER PUBLICATIONS

Copy of International Search Report for International Patent Application No. PCT/US04/019966, dated Nov. 16, 2004, 8 pages.
Copy of Written Opinion for International Patent Application No. PCT/US04/019966, dated Nov. 16, 2004, 5 pages.

* cited by examiner

Primary Examiner—Justine R. Yu
Assistant Examiner—Peter deVore
(74) Attorney, Agent, or Firm—Marshall, Gerstein & Borun LLP

(57) ABSTRACT

An electrical grounding assembly for a control valve providing a shared electrical connection between a valve body and valve trim. An elastic grounding connector having an elastic region and an electrically conductive surface is placed between the valve body and the valve trim. The valve trim compresses the electrically conductive surface of the elastic grounding connector to deform the elastic region of the elastic grounding connector to form a shared electrical connection between the valve body and the valve trim.

5 Claims, 1 Drawing Sheet

ELECTRICAL GROUNDING ASSEMBLY FOR CONTROL VALVE

TECHNICAL FIELD

The electrical grounding assembly described herein makes known a device to substantially eliminate the electric potential difference between components within a control valve. More specifically, an electrical grounding assembly is disclosed having an arrangement that significantly reduces installation expense and substantially decreases maintenance intervals by creating a shared electrical connection between electrically isolated control valve components within the control valve.

BACKGROUND

Control valves are commonly used to control fluid flow through a pipe. As known to those skilled in the art, a control valve regulates the rate of fluid flow as an actuator changes the position of a moveable operator or valve trim within the control valve. Certain process fluids may be very corrosive to the control valve. To counteract the effects of the corrosive process fluid, control valve manufacturers may select special materials that are generally impervious to the corrosive effects of the process fluid. For example, nickel alloy UNS N10276 is known to have superior corrosion resistance to a wide range of corrosive agents. Using special corrosion resistant alloys, particularly in valve bodies, can be cost prohibitive for less expensive valves like butterfly-style control valves. Valve manufacturers generally address this cost issue by supplying the valve body with a corrosion resistant, non-conductive liner.

The advantage of a lined valve is that the valve body is not wetted by the process fluid and therefore can be made from less expensive materials when used in corrosive applications. Valve body liners are typically made from elastomers such as ethylene propyl terpolymer (EPDM). These elastomers are typically non-conductive and have dielectric properties. As known to those skilled in the art, the dielectric material substantially insulates the valve trim from the valve body effectively creating a capacitor that may store an electrostatic charge. Additionally, numerous control valve applications do not use packing materials, seals, and/or guide bushings that have conductive properties. Therefore, if the valve trim is not positively grounded to the valve body with a shared electrical connection, fluid flow through the valve body and across the valve trim may create an electrostatic charge transfer that can accumulate similar to a capacitor accumulating an electrostatic charge. The accumulating charge can establish a potential difference of several thousand volts between the valve body and valve trim. As is known, when the accumulated charge exceeds the breakdown voltage of the dielectric or insulator, an arc may result. Also, if a momentary discharge path is created between the valve body and the valve trim, for example a wrench being used during routine maintenance, an arc could be struck. As a result, numerous industry standards and governmental regulations require that equipment used in an explosive atmosphere shall be designed to operate safely in that atmosphere. The equipment, including mechanical devices such as valves, must be free of sources that may lead to ignition of the surrounding atmosphere.

Typical solutions include the use of external grounding straps between valve components and conductive packing. Due to cost, however, these solutions are not applicable to all control valve designs. External straps can also be severed during operation subsequently creating an ignition source at the control valve. Lastly, known to those skilled in the art, the external surfaces of valve bodies and actuators are typically painted with a powder-coated paint that provides an extremely durable, scratch resistant coating that also functions as an insulator. Therefore, conventional assemblies require manual removal of the paint from conductive surfaces to provide a shared electrical connection between the valve components. In a manufacturing operation, these manual operations are time consuming and expensive.

SUMMARY

Accordingly, it is the object of the electric grounding assembly to substantially eliminate the electric potential between control valve components used in potentially explosive atmospheres. More specifically, the present electrical grounding assembly places an elastic grounding connector in an outboard bearing hole of a control valve creating a shared electrical connection between the valve trim and the valve body.

In accordance with one aspect of the present electrical grounding assembly, an electrically conductive, deformable ball is located in a bore within the valve body. The deformable ball is made from stranded metal wire. Upon assembly, the valve trim compresses the deformable ball making contact with the valve trim and valve body thereby creating a shared electrical connection between the valve trim and the valve body.

In accordance with another aspect of the present electrical grounding assembly, a conical metal spring is located in a bore within the valve body between the valve trim and the valve body creating a shared electrical connection within the control valve.

BRIEF DESCRIPTION OF THE DRAWINGS

The features of this present electrical grounding assembly are believed to be novel and are set forth with particularity in the appended claims. The present electrical grounding assembly may be best understood by reference to the following description taken in conjunction with the accompanying drawings in which like reference numerals identify like elements in the several figures and in which:

DETAILED DESCRIPTION

To fully appreciate the advantages of the present electrical grounding assembly, its functions and features are described in connection with a butterfly-style control valve. However, one skilled in the art would appreciate the present electrical grounding assembly could be used in other types of valves.

Figure 1:
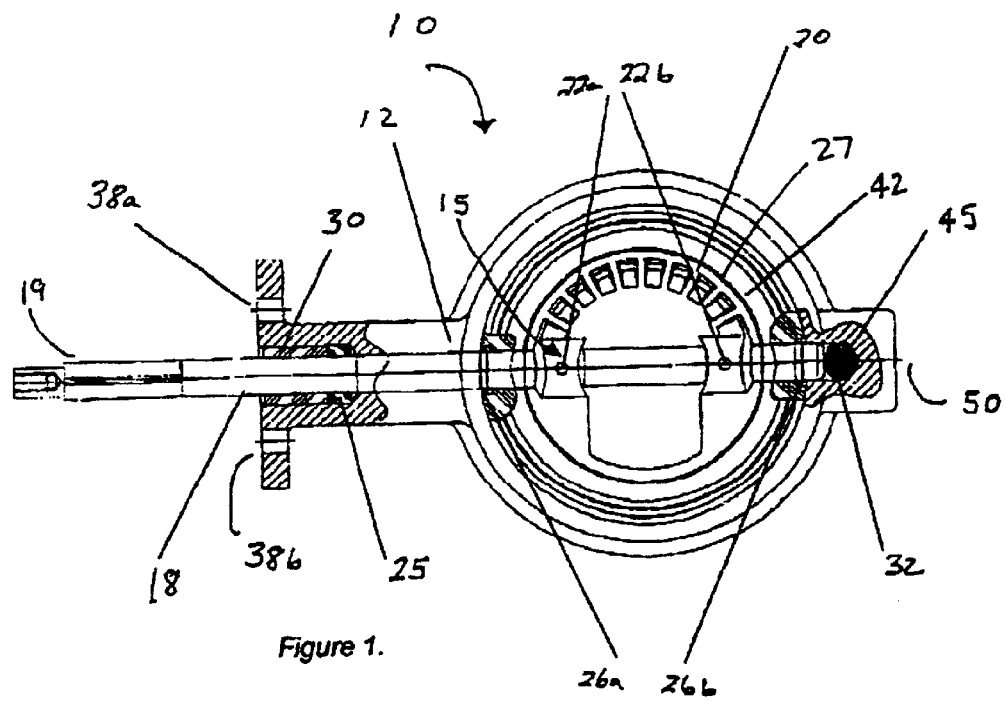
FIG. 1 is a cross-sectioned side view of an elastomer lined butterfly-style control valve with a deformable stranded metal ball providing a shared electrical connector within the control valve.

Referring now to FIG. 1, a cross-sectioned side view of an elastomer lined butterfly-style control valve is depicted with a deformable stranded metal ball providing a shared electrical connection within the control valve. The butterfly-style control valve 10 is comprised of a valve body 12 and the valve trim 15. The valve trim 15 is typically defined as the internal components of the control valve 10 that regulate the flow of the process fluid. In the present embodiment, the valve trim 15 is comprised of a valve shaft 18 and a control disk or vane 20, both being fabricated from non-corrosive stainless steel such as UNS S31600. The control disk 20 is attached to the valve shaft 18 with two taper pins 22a and 22b pressed into alignment holes (not shown) in both the valve shaft 18 and the control disk 20. The process fluid is contained within the valve body 12 by non-conductive valve packing 25 and non-conductive o-ring seals 26a and 26b. A non-conductive guide bushing 30 on the inboard side of the valve body 12 and an outboard-bearing hole 32 align the valve trim 15 within the valve body 12. An actuator (not shown) is fastened to the inboard side of the valve body 12 with actuator bolts (not shown) completing the attachment through the actuator mounting holes 38a and 38b. The actuator directly couples to inboard end 19 of the valve shaft 18 and rotates the valve trim 15 about a longitudinal axis 50 defined by the valve shaft 18. The exterior of the actuator and the valve body 12 are typically painted with a non-conductive powder-coated paint process that insulates the actuator from both the valve body 12 and the valve trim 15.

A non-conductive elastomer liner 42 concomitantly creates a soft annular seating surface 27 for the control disk 20 to engage during operation and forms a barrier between the valve body 12 and the process fluid. Subsequently, the barrier provided by the elastomer liner 42 electrically isolates the valve trim 15 from the valve body 12. As known to those skilled in the art, the dielectric properties of the elastomer liner 42 effectively establish a capacitor between the valve body 12 and the valve trim 15 that can store an electrostatic charge. The accumulation of the charge may create a safety hazard by presenting an ignition source when used in a potentially explosive environment. Therefore, the charge must be prevented from accumulating by creating an electrical ground around the capacitor established by the elastomer liner 42.

As shown in FIG. 1, the preferred electrical grounding assembly is comprised of a conductive, stranded metal ball 45 formed to fill the outboard-bearing hole 32 of the valve body 12. The stranded metal ball 45 is fashioned from substantially random windings of stranded metal similar to conventional steel wool. In the preferred embodiment, the stranded metal ball 45 is preferably made from a corrosion resistant metal such as stainless steel S31600, but other corrosion resistant, conductive materials can be used. During assembly of the control valve 10, the valve shaft 18 is placed through the non-conductive guide bushing 30 and the valve packing 25. The stranded metal ball 45 is placed within the outboard bearing hole 32 prior to final installation of the valve shaft 18. Upon final installation, the valve shaft 18 is loaded into the outboard-bearing hole 32 consequently compressing the stranded metal ball 45. Due to the resiliency of stranded metal, the stranded metal ball 45 inherently forms an elastic region within the stranded metal ball that maintains contact between the conductive surface of the stranded metal ball, the bare metallic walls of the outboard-bearing hole 32 in the valve body 12, and the valve trim 15 through the valve shaft 18 during operation of the control valve 10. This shared electrical connection grounds the electrostatic charge accumulation by eliminating the electrical isolation between the valve trim 15 and the valve body 12.

Unlike conventional external grounding straps that provide a single connection point, the numerous strands of metal within the stranded metal ball 45 maintain a plurality of electrical contact points between the outboard bearing hole 32 and the valve trim 15, thereby providing an improved shared electrical connection. Additionally, by maintaining an internal shared electrical connection within the control valve 10, the potential for catastrophic failure of the connection due to physical separation is substantially eliminated. The preferred electrical grounding assembly also reduces assembly time and saves manufacturing costs by eliminating the need to manually remove paint to expose conductive surfaces and eliminates the drilling and tapping of bolt holes to attach an external grounding strap.

Figure 2:
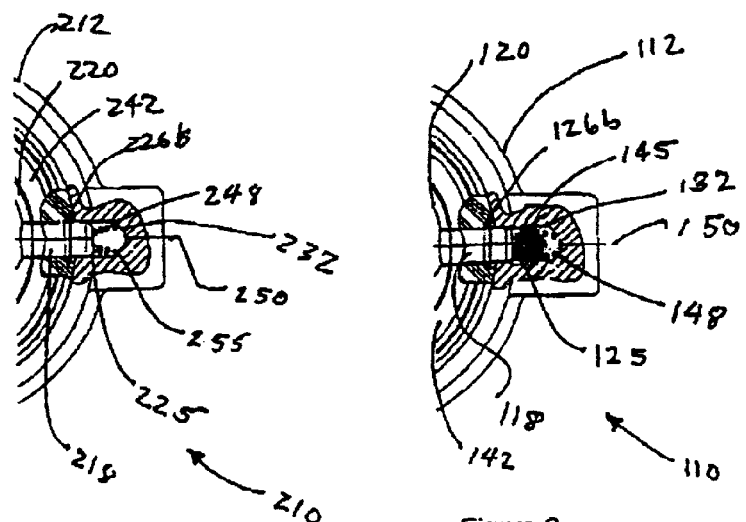
FIG. 2 is a partial cross-section side view of an elastomer lined butterfly-style control valve using a conical spring in combination with the stranded metal ball to create a shared electrical connection within the control valve.

Turning now to FIG. 2, an elastic grounding connector according to another embodiment of the present electrical grounding assembly is depicted. For a butterfly-style control valve 110 with a deep outboard bearing hole 132, as depicted, the stranded metal ball 145 can be biased towards the outboard end 125 of the valve shaft 118 with a helical bias spring 148. The helical bias spring 148 compensates for variations in depth of the outboard-bearing hole 132 and will assure that the stranded metal ball 145 stays in contact with the valve shaft 118 in applications where the valve shaft 118 can oscillate along its longitudinal axis 150.

Figure 3:
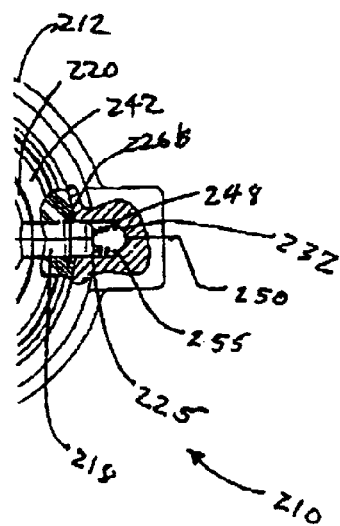
FIG. 3 is a partial cross-section side view of an elastomer lined butterfly-style control valve using a single conical spring to create a shared electrical connection within the control valve.

In FIG. 3, another embodiment of the elastic grounding connector of the present electrical grounding assembly is illustrated. A single conical spring 248 is placed in the outboard-bearing hole 232. The spring 248 makes contact between the outboard end 225 of the valve shaft 218 and the valve body of 212 through the bare metallic surface of the outboard-bearing hole 232. As known to those skilled in the art, the conical winding of the spring 248 is formed such that the outboard end 255 of the spring 248 is slightly larger than the diameter of the outboard-bearing hole 232 to retain the spring 248 in the outboard-bearing hole 232 during assembly.

The foregoing detailed description has been given for clearness of understanding only, and no unnecessary limitations should be understood therefrom, as modifications will be obvious to those skilled in the art. For example, it can be appreciated by those skilled in the art that the present electrical grounding assembly is not limited to spherical or ball shaped geometry, but may assume any shape to fill the outboard-bearing hole to create a shared electrical connection. Furthermore, one skilled in the art can further appreciate the elastic connector could be permanently attached to the outboard end of the valve shaft with a screw or rivet to ensure constant contact between the valve trim and the valve body.

What is claimed is:

1. An electrical grounding assembly for a control valve comprising:

a valve body;

a valve trim electrically isolated from the valve body; and an elastic grounding connector having in combination an elastic region and an electrically conductive surface compressed between the valve body and the valve trim to form and maintain an internal electrical contact between the valve body and valve trim wherein the elastic grounding connector is comprised of deformable stranded metal generally formed as a ball.

2. The electrical grounding assembly of claim 1, wherein the valve body has a bore adjacent to the valve trim for receiving the elastic grounding connector.

3. The elastic grounding connector assembly of claim 1, wherein the elastic grounding connector includes a bias spring such that the bias spring places the deformable stranded metal ball in continuous contact with the valve trim and the valve body.

4. A method to substantially reduce the electric potential across a control valve assembly wherein the control valve assembly comprises at least a valve body and a valve trim, the valve trim being electrically isolated from the valve body, the method comprising:

providing an elastic conductive grounding connector, the elastic conductive grounding connector being comprised of a deformable stranded metal ball;

forming the valve trim from at least a valve shaft and a control element, the valve shaft having an outboard end;

forming the valve body with a bore sized to receive the elastic conductive grounding connector and the outboard end of valve shaft;

filling the bore with the elastic grounding connector; and placing the valve trim within the valve body with the outboard end of the valve shaft in the valve body bore so that the outboard end of the valve shaft compresses the elastic conductive grounding connector thereby forming a shared electrical connection between the valve body and the valve trim.

5. The elastic grounding connector assembly of claim 4, wherein the elastic grounding connector includes a bias spring such that the bias spring places the deformable stranded metal ball in continuous contact with the valve trim and the valve body.

* * * * *